(12) United States Patent
Li

(10) Patent No.: US 8,282,064 B2
(45) Date of Patent: Oct. 9, 2012

(54) SUPPORT MECHANISM AND ELECTRONIC DEVICE USING THE SAME

(75) Inventor: Zhi-Guang Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 331 days.

(21) Appl. No.: 12/779,126

(22) Filed: May 13, 2010

(65) Prior Publication Data
US 2011/0074257 A1 Mar. 31, 2011

(30) Foreign Application Priority Data

Sep. 30, 2009 (CN) .......................... 2009 1 0308062

(51) Int. Cl.
*A47G 29/00* (2006.01)
(52) U.S. Cl. .................. 248/372.1; 248/423; 248/923; 361/679.02
(58) Field of Classification Search .................... 40/748, 40/749, 761, 762, 753, 754, 755, 756; 248/454, 248/455, 456, 457, 461, 465, 462, 477, 478, 248/371, 372.1, 407, 412, 423, 923; 361/679.01, 361/679.02, 725, 752, 753, 796
See application file for complete search history.

(56) References Cited

U.S. PATENT DOCUMENTS

| | | | | |
|---|---|---|---|---|
| 4,807,609 A * | 2/1989 | Meals | ............................... | 602/20 |
| 5,725,278 A * | 3/1998 | Verbeek | ......................... | 297/353 |
| 5,732,928 A * | 3/1998 | Chang | ............................ | 248/688 |
| 6,517,041 B2 * | 2/2003 | Raum | ............................ | 248/424 |
| 7,001,088 B2 * | 2/2006 | Hui-hu | ........................... | 400/681 |
| 7,104,516 B2 * | 9/2006 | Uto et al. | ...................... | 248/688 |
| 7,249,739 B2 * | 7/2007 | Chueh et al. | ................... | 248/133 |
| 7,753,336 B2 * | 7/2010 | Hu | ................................ | 248/688 |
| 2005/0035252 A1 * | 2/2005 | Chen | ........................... | 248/284.1 |
| 2005/0253040 A1 * | 11/2005 | Yang | ............................ | 248/688 |
| 2009/0268383 A1 * | 10/2009 | Zhang et al. | ............. | 361/679.01 |

* cited by examiner

*Primary Examiner* — Bradley Duckworth
*Assistant Examiner* — Erin W Smith
(74) *Attorney, Agent, or Firm* — Altis Law Group, Inc.

(57) ABSTRACT

A support mechanism comprises a support board, a bracket and a stopping mechanism. The support board comprises an end portion and a center portion, the support board end is configured to pivotably connect to a housing. The bracket comprises a first end and a second end, the first end is configured to pivotably connected to the support board center portion. The stopping mechanism is adapted for coupling the second end to the housing such that the bracket is selectively and stably stopping at a closed position and an open position or positions between the closed position and the open position.

15 Claims, 6 Drawing Sheets

SUPPORT MECHANISM AND ELECTRONIC DEVICE USING THE SAME

BACKGROUND

1. Technical Field

The exemplary disclosure relates to support mechanisms, particularly to support mechanisms used in electronic devices.

2. Description of Related Art

Some portable electronic products will come with a bracket on the back of the casing. Thus, when the bracket is propped up, the portable electronic product can sit on the desk or other supporting planes to make it more comfortable for the users to view the displays. Folding the bracket flush with the back of the unit makes them more convenient to carry.

However, the brackets of the existing portable electronic products do not have adjustable lengths and as a result, the supporting angle of the portable electronic product cannot be changed to satisfy some requirements of the users.

Therefore, there is room for improvement within the art.

BRIEF DESCRIPTION OF THE DRAWINGS

Many aspects of the exemplary support mechanism and electronic device using the support mechanism can be better understood with reference to the following drawings. These drawings are not necessarily drawn to scale, the emphasis instead being placed upon clearly illustrating the principles of the present support mechanism and electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
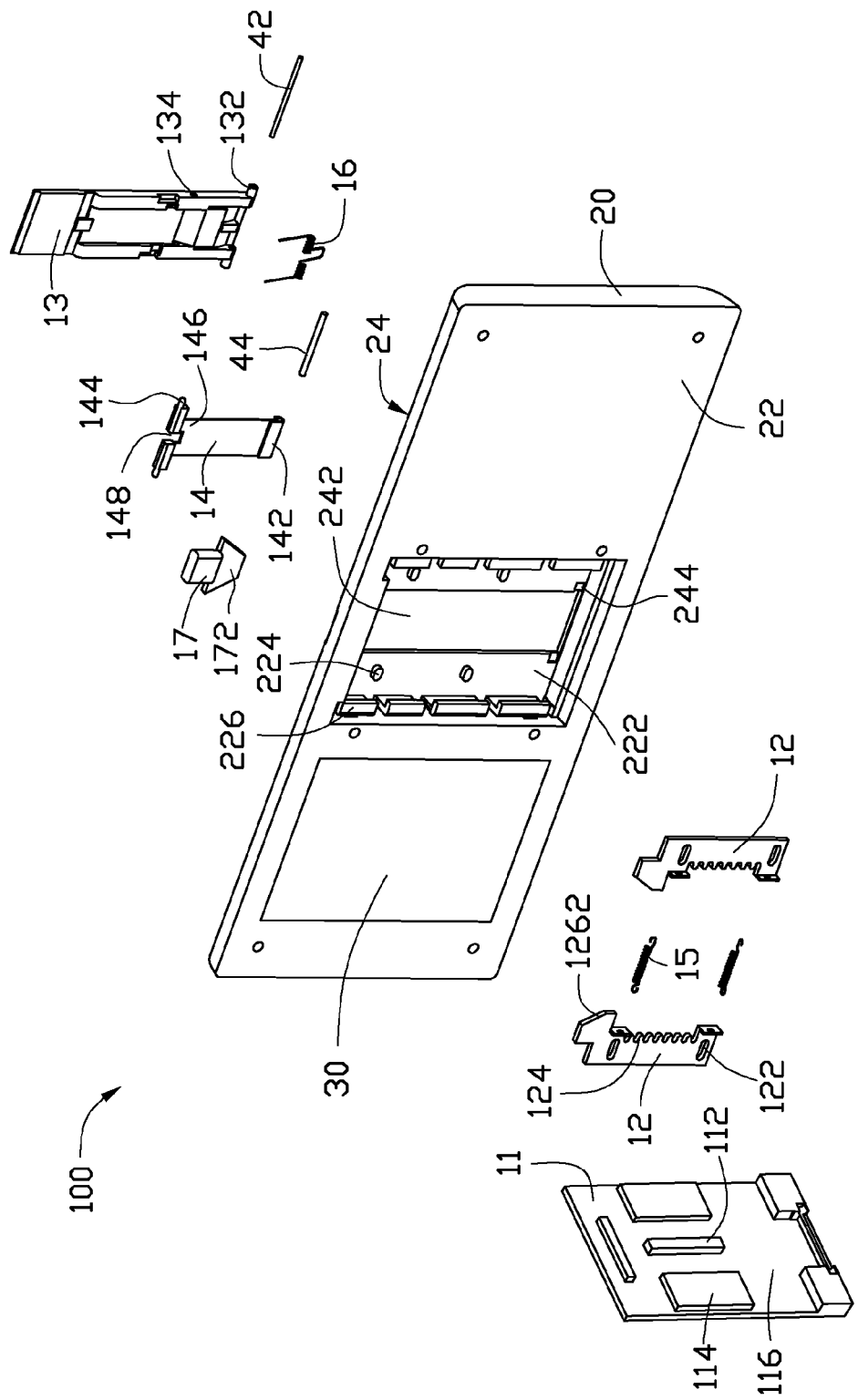
FIG. 1 is a exploded view of an electronic device support mechanism according to an exemplary embodiment.
Figure 2:
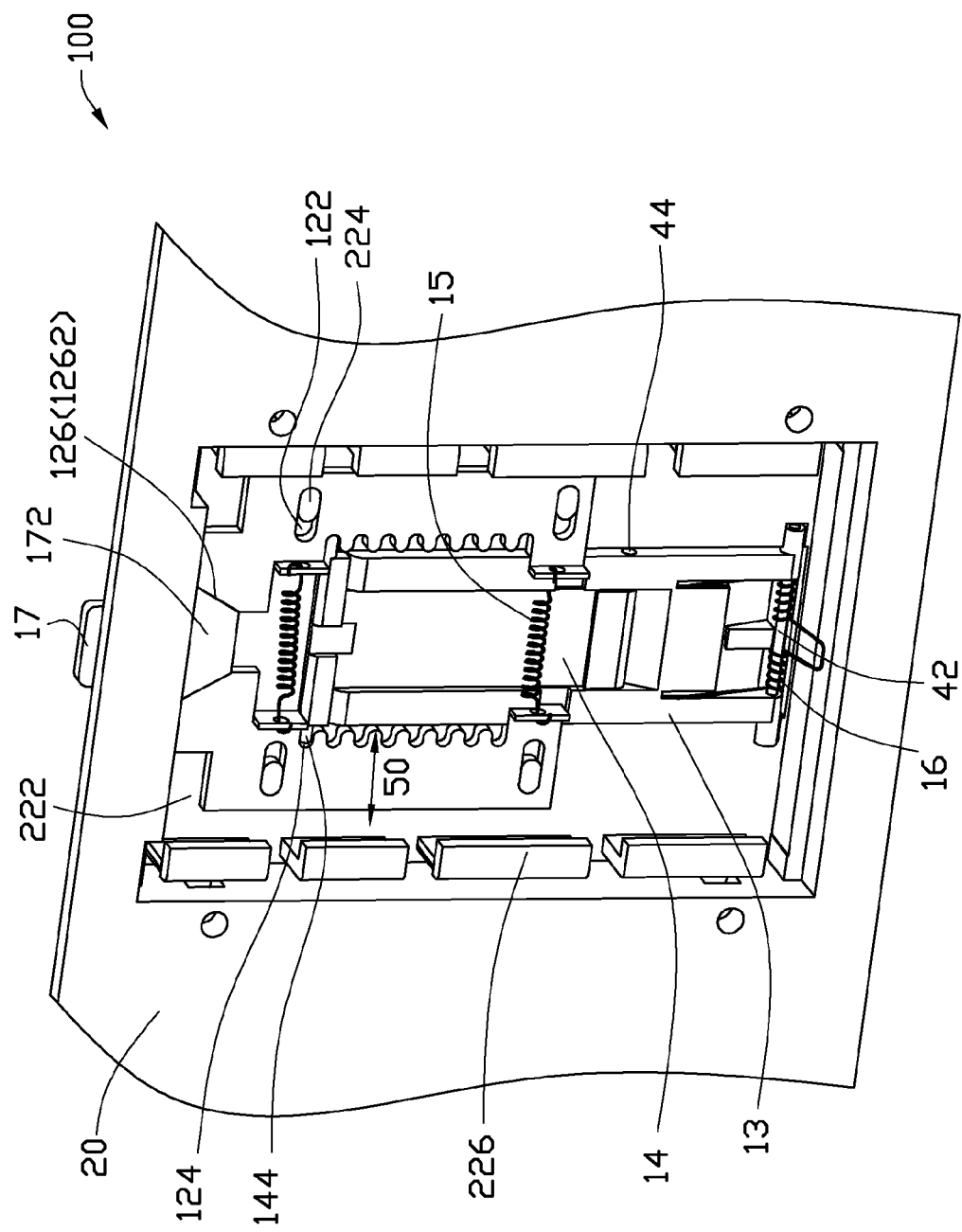
FIG. 2 is an assembled and partially enlarged view of the electronic device with the support mechanism in a closed position.

An embodiment of an electronic device 100 incorporating a support mechanism (not labeled) is shown in FIG. 1 and FIG. 2. FIG. 1 illustrates an exploded view of the device 100. FIG. 2 illustrates, in perspective view, the support mechanism in a first or closed state. For clarity, latching board 11 of support mechanism is not shown in FIG. 2

The device 100, which may be, but is not limited to, a mobile phone, includes the support mechanism, a housing 20 and a display 30. In the closed state 200, the support mechanism is secured in the housing 20 to allow the portability of the device. The support mechanism may also be pivotably adjusted to an open position shown in FIG. 4 and FIG. 5, to advantageously provide support of the device 100. For clarity, the latching board 11 of support mechanism is not shown in the FIG. 4.

The housing 20 includes a front surface 22 and a back surface 24 opposite to the front surface 22. The housing 20 has a first mounting portion 222 that is a concave recess in the front surface 22, and a second mounting portion 242 that is an opening which is defined in the back surface 24 and aligned to and communicating with the first mounting portion 222. The display 30 is positioned on the front surface 22.

Figure 3:
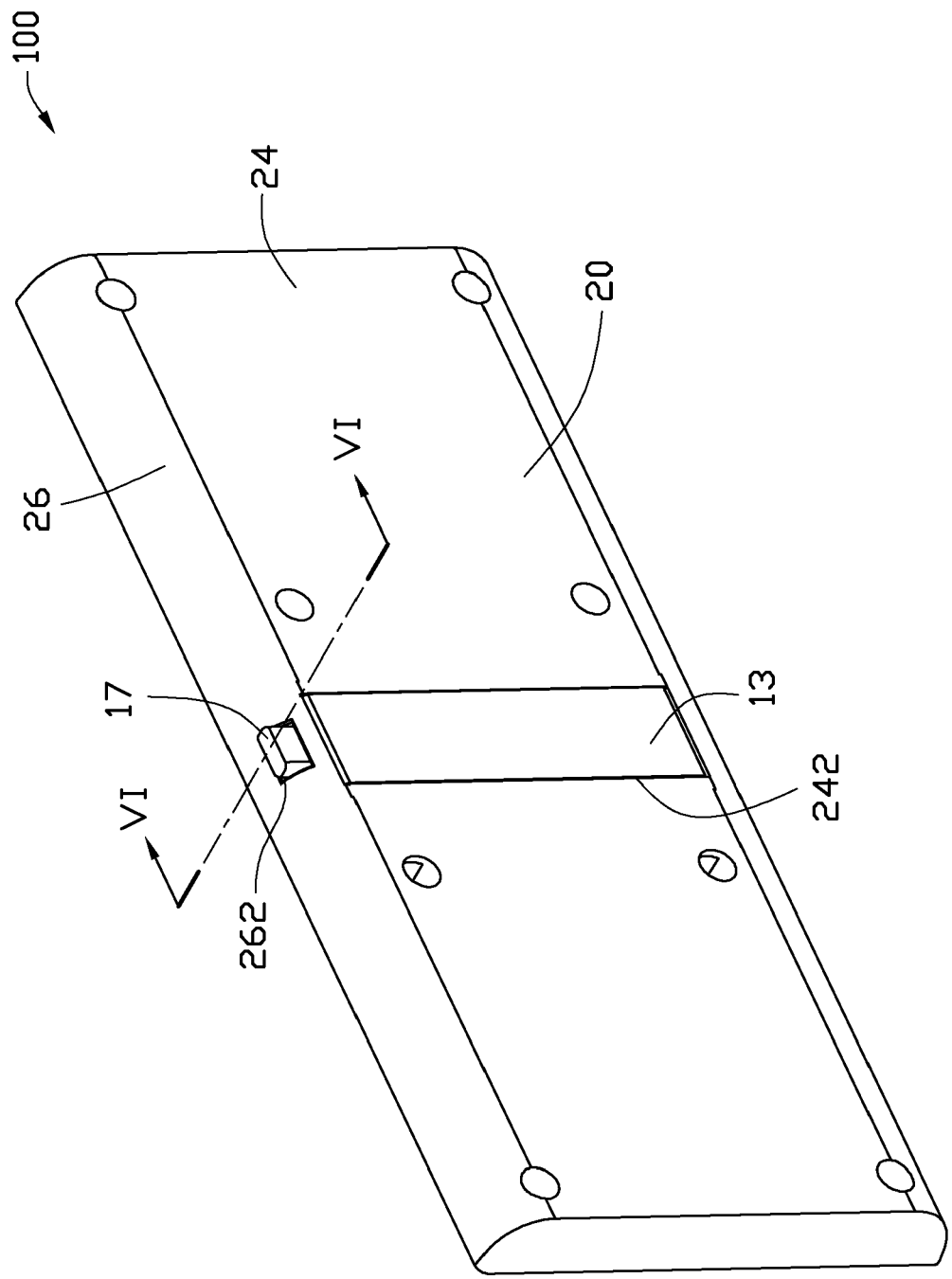
FIG. 3 is an another assembled view of the electronic device of FIG. 2, showing another aspect thereof.

Referring to FIGS. 1 to 3, the support mechanism includes two sliders 12 opposite to and spaced from each other to accommodated slidably in the first mounting portion 222 of the housing 20. A support board 13 is coupled pivotably to the housing 20 by a first shaft 42 and a bracket 14 is coupled pivotably to the support board 13 by a second shaft 44.

Two slide enabling members (not labeled) are illustrated in FIGS. 1 and 2. Each slide enabling member provides a mechanism for one corresponding slider 12 to slidably engage with the first mounting portion 222. Each slide enabling member, in this embodiment, comprises a set of rails 224 and a set of tracks 122 that engage the rails 224. Each set of rails 224 are protruding from a bottom of the first mounting portion 222 and located adjacent to a side of the second mounting portion 242 and each set of tracks 122 are defined in each of the sliders 12. The tracks 122 have the same shape as the rails 224, but are larger than the rails 224, so that the sliders 12 can be slid laterally relative to the housing 20 along the arrow 50 shown in FIG. 2 when the sliders 12 are mounted to the first mounting portion 222.

A first resisting member 15 is coupled between the sliders 12. The first resisting member 15 exerts a force on the sliders 12, causing the sliders 12 to slide toward each other along the rails 224 when an external force separating the sliders is released. The first resisting member 15 may be an elastic resisting member (such as an expansion spring, a compression spring, or an elastic band). In this embodiment, the first resisting member 15 includes two parallel compression springs in which two ends of each compression spring are respectively retained on the sliders 12.

The first shaft 42 is configured to be pivotally coupled to one end portion 132 of the support board 13 to the housing 20 at one end 244 of the second mounting portion 242. The support board 13 can be rotated relative to the housing 20 from the closed position shown in FIG. 2 or retracted from the open position shown in FIG. 4. The support board 13 in this embodiment is complementary in shape to the second mounting portion 242 of the housing 20. The support board 13 is accommodated in the second mounting portion 242 when the support mechanism is in a closed state.

A second resisting member 16 is coupled between the support board 13 and the housing 20. The second resisting member 16 exerts a force on the support board 13 and the housing 20, causing the support board 13 to rotate about the first shaft 42 relative to the housing 20. The second resisiting member 16 may be an elastic resisting member, such as a compression spring. In this embodiment, the second resisting member 16 could also be used for resisting or latching the support board 13 in the closed position shown in FIG. 2.

Figure 4:
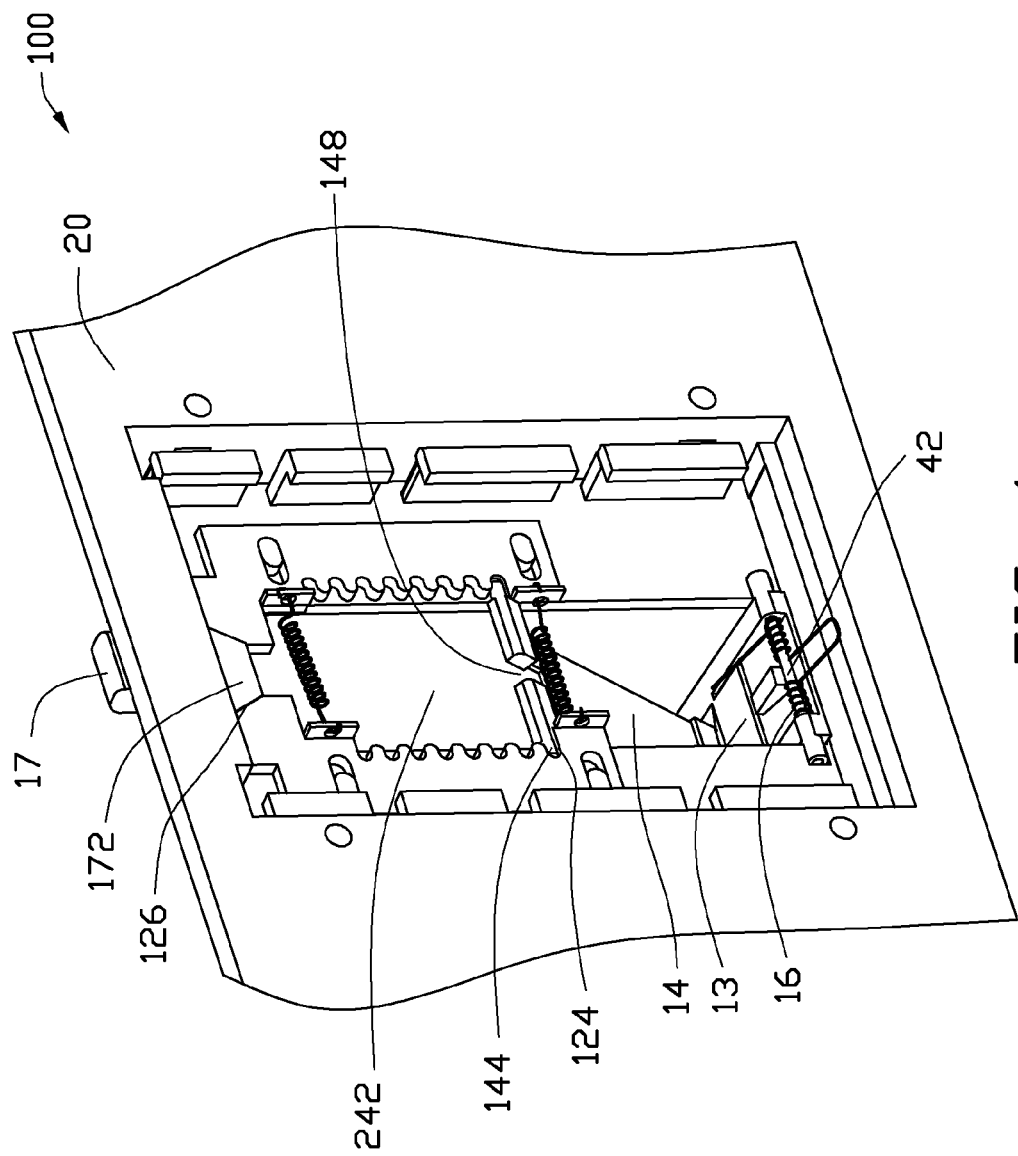
FIG. 4 is similar to the FIG. 2, showing the support mechanism in an open position.
Figure 5:
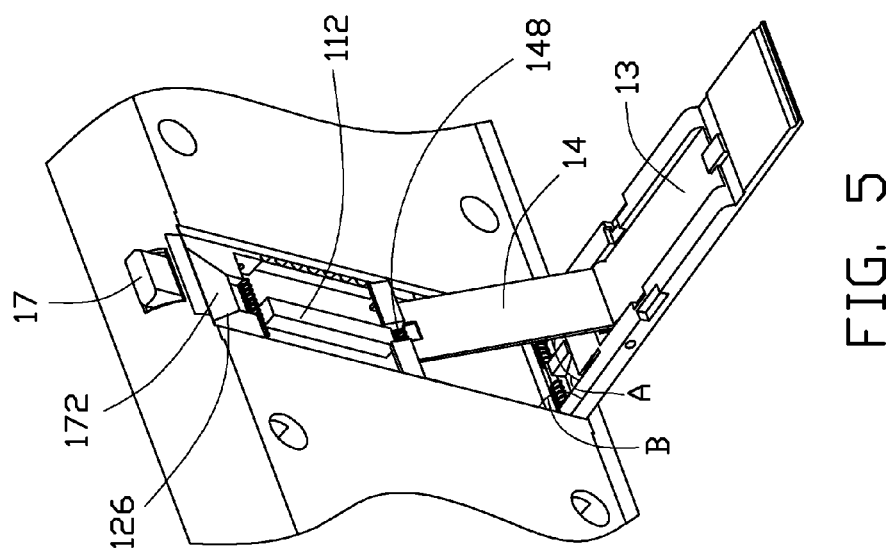
FIG. 5 is similar to the FIG. 4, but showing the electronic device in another aspect thereof.

The second shaft 44 is configured to pivotally couple one end 142 of the bracket 14 to a center portion 134 of the support board 13, such that the bracket 14 can be rotated relative to the support board 13 from the closed position shown in FIG. 2 or to retract from the open position shown in FIG. 4 or 5.

A stopping mechanism (not labeled) is illustrated in FIGS. 1 to 2 and FIG. 5. The stopping mechanism provides a mechanism that defines the points at which the bracket 14 stops in the closed position shown in FIG. 2 and the open position shown in FIG. 5 or other open positions between the closed position shown in FIG. 2 and the open position shown in FIG.

5. In this embodiment, the stopping mechanism comprises two sets of stopping grooves 124 and a set of stopping members 144 that engages the two set of stopping grooves 124. Each set of the stopping grooves 124 includes a plurality of stopping grooves 124, which are longitudinally defined in one side of one slider 12 and facing the other slider 12. Each stopping groove 124 of each set of the stopping grooves 124 is facing to and aligned with one corresponding stopping grooves 124 of another set of the stopping grooves 124. In this embodiment, one stopping groove 124 of one set of the stopping grooves 124 and one corresponding stopping groove 124 of the another set of the stopping grooves 124 cooperatively forms a pair of stopping groove 124, which cooperatively engage with the stopping members 144. The stopping members 144 are located on the second end 146 of the bracket 14 opposite to the first end 142, are engaged with one pair of the plurality stopping grooves 124 of the two sets of the stopping grooves 124. Thus, defining a corresponding angle A (see FIG. 5) between the support board 13 and the bracket 14 such that an angle B (see FIG. 5) between the housing 20 and the bracket 14 is defined for viewing of the display 30. Angle A can be changed in such manner that the stopping members 144 slidably engage from one set of the plurality stopping grooves in the set of stopping grooves 124 to another set of the plurality of stopping grooves in the set of stopping grooves 124. Such that angle B is adjusted for better viewing of the display 30.

An actuating member (not labeled) is illustrated in FIGS. 1 to 3. The actuating configuration provides a mechanism for driving the sliders 12 to slide away from each other, thereby facilitating the stopping members 144 slidably engaged in one pair of the plurality of stopping grooves to another pair of the plurality of stopping grooves defined in the set of stopping grooves 124. The actuating member, in this embodiment, comprises a wedged notch 126 (see FIG. 2) defined between the sliders 12. When the sliders 12 are assembled in the first mounting portion 222 of the housing 20, and a trigger 17 which is slidably mounted in a hole 262 (see FIG. 3) define an inside surface 26 of the housing 20 and have a wedged portion 172 (see FIG. 3) extending into the wedged notch 126. The wedged notch 126, in this embodiment, is defined by two opposite wedged walls 1262 that are respectively formed at one end of each slider 12. The wedged portion 172 of the trigger 17 moves along the wedged walls 1262 to cause the sliders 12 to slid away from each other when the trigger 17 moves toward the sliders 12. Such that the stopping members 144 are released from one pair of the plurality of stopping grooves to slidably engage with another pair of the plurality of stopping grooves defined in the set of stopping grooves 124. Thus, angle A (see FIG. 5) between the support board 13 and the bracket 14 is changed, and angle B (see FIG. 5) between the housing 20 and the bracket 14 is adjusted for a better view of the display.

Figure 6:
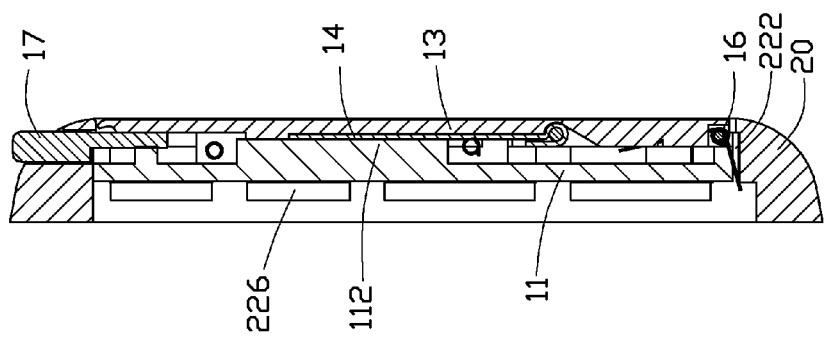
FIG. 6 is a cross sectional view of the electronic device of FIG. 3 along the line of VI-VI.

The support mechanism could also further include a guiding configuration (not labeled) illustrated in FIG. 1 and FIGS. 5 and 6. The guiding configuration provides a mechanism for guiding the bracket 14 to slide relative to the sliders 12 when the sliders 12 move away from each other to release the latching members 144 under the trigger 17. In this embodiment, the guiding configuration comprises a guiding member 112 and a guiding groove 148 that engages the guiding member 112. Referring to FIG. 1, the guiding member 112 is protruding from the latching board 11 that is latched in the first mounting portion 222 by a plurality of latching members 226 (e.g. L-shaped hook). The guiding groove 148 is defined in the second end 146 of the bracket 14 between the stopping members 144. The bracket 14 slides relative to the sliders 12 with the guiding member 112 slid in the guiding groove 148 when the stopping members 144 slidably engage with the plurality of stopping grooves defined in the set of stopping grooves 124 to adjust angle as shown in FIG. 5. In this embodiment, the latching board 11 further includes two blocks 114 protruding from a surface 116 thereof facing the sliders 12. The blocks 114 resist the sliders 12 when the latching board 11 is latched in the first mounting portion 122, which acts as a securing mechanism for retaining the sliders 12 in the first mounting portion 222.

Referring to FIGS. 2, 4 and 5, during operation, the trigger 17 is pushed. The wedged portion 172 of the trigger 17 is then moved along the wedged walls 1262 to cause the sliders 12 to slide away from each other to release the stopping members 14 from the plurality of stopping grooves defined in the set of stopping grooves 124. The support board 13 is then rotated about the first shaft 42 relative to the housing 20 to angle angle B. During this motion, the bracket 14 is moved together with the support board 13 and is rotated about the second shaft 44 relative to the support board 13 to angle angle A. After that, angle A is changed in such manner that the stopping members 144 slidably engage from one pair of the plurality of stopping grooves defined in the set of stooping groove 124 to another pair of the plurality of stopping grooves, such that angle B is adjusted for better viewing of the display 30.

Even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A support mechanism used to support a housing, the support mechanism comprising:
    two opposite sliders slidably mounted to the housing;
    a support board comprising an end portion and a center portion, wherein the support board end is configured to pivotably connect to the housing;
    a bracket comprising a first end and a second end, wherein the first end is configured to pivotably connect to the support board center portion; and
    a stopping mechanism adapted for coupling the second end to the housing such that the bracket is selectively and stably stopped at a closed position and an open position or positions between the closed position and the open position;
    wherein the stopping mechanism comprises two sets of stopping grooves and a set of stopping members that slidably engages the two set of stopping grooves to configure an angle between the support board and the bracket, so as to adjust an angle between the support board and the housing; each set of the stopping grooves includes a plurality of stopping grooves, which are longitudinally defined in one side of one slider and facing the other slider, each stopping groove of each set of the stopping grooves is facing to and aligned with one corresponding stopping grooves of the other set of the stopping grooves.

2. The support mechanism of claim 1, wherein one stopping groove of one set of the stopping grooves and one corresponding stopping groove of the another set of the stopping grooves cooperatively forms a pair of stopping groove, which cooperatively engage with the stopping members.

3. The support mechanism of claim 1, further comprising two slide enabling members coupled between the sliders and the housing for enabling the sliders to slide relative to the housing.

4. The support mechanism of claim 3, wherein each slide enabling member comprises a set of rails and a set of tracks that engage the rails; the rails are located at the housing and the tracks are defined in the sliders corresponding to the rails.

5. The support mechanism of claim 1, further comprising a first biasing member coupled between the sliders to exerts a force on the sliders, thereby causing the sliders to slide toward each other when an external force separating the sliders is released.

6. The support mechanism of claim 1, wherein the housing includes a front surface and a back surface, the housing has a first mounting portion defined in the front surface, and a second mounting portion defined in the back surface aligned to and communicating with the first mounting portion; the sliders are slidably mounted to the first mounting portion respectively located besides two sides of the second mounting portion, and the support board is accommodated in the second mounting portion when the support mechanism is in the closed position.

7. The support mechanism of claim 6, wherein the support board end is pivotably coupled at one end of the second mounting portion.

8. The support mechanism of claim 1, wherein an actuating member provides a mechanism for driving the sliders to slide away from each other, thereby facilitating the stopping members slidably engaging from one set of the stopping grooves to another set of the stopping grooves.

9. The support mechanism of claim 8, wherein the actuating member comprises a wedged notch defined between the sliders when the slider mounted to the housing, and a trigger having a wedged portion extending into the wedged notch.

10. The support mechanism of claim 1, wherein a guiding means is configured for guiding the bracket to slide relative to the sliders when the sliders away from each other to release the latching members under the trigger.

11. The support mechanism of claim 10, wherein the guiding means comprises a guiding member and a guiding groove that engages the guiding member;
the support mechanism further comprises a latching board latched on the housing; the guiding member is protruding from the latching board, the guiding groove is defined in the second end between the stopping members.

12. The support mechanism of claim 1, wherein the stopping members are located on the second end of the bracket.

13. The support mechanism of claim 1, wherein a second biasing member is coupled between the support board and the housing to exerts a force on the support board and the housing, thereby causing the support board to rotate relative to the housing.

14. An electronic device comprising:
A housing; and
a support mechanism comprising:
two opposite sliders slidably mounted to the housing;
a support board comprising an end portion and a center portion, wherein the support board end is configured to pivotably connect to the housing;
a bracket comprising a first end and a second end, wherein the first end is configured to pivotably connect to the support board center portion; and
a stopping mechanism adapted for coupling the second end to the housing such that the bracket is selectively and stably stopped at a closed position and an open position or positions between the closed position and the open position;
wherein the stopping mechanism comprises two sets of stopping grooves and a set of stopping members located on the second end of the bracket, the set of stopping members slidably engages the two set of stopping grooves to configure an angle between the support board and the bracket, so as to adjust an angle between the support board and the housing; each set of the stopping grooves includes a plurality of stopping grooves, which are longitudinally defined in one side of one slider and facing the other slider, each stopping groove of each set of the stopping grooves is facing to and aligned with one corresponding stopping grooves of the other set of the stopping grooves.

15. The electronic device of claim 14, wherein one stopping groove of one set of the stopping grooves and one corresponding stopping groove of the another set of the stopping grooves cooperatively forms a pair of stopping groove, which cooperatively engage with the stopping members.

* * * * *